(12) United States Patent
Tong

(10) Patent No.: US 10,997,196 B2
(45) Date of Patent: May 4, 2021

(54) SYSTEMS AND METHODS FOR REDUCING DATA STORAGE OVERHEAD

(71) Applicant: Elasticsearch B.V., Mountain View, CA (US)

(72) Inventor: Zachary Tong, Milton, VT (US)

(73) Assignee: Elasticsearch B.V., Amsterdam (NL)

(*) Notice: Subject to any disclaimer, the term of this patent is extended or adjusted under 35 U.S.C. 154(b) by 86 days.

(21) Appl. No.: 16/175,721

(22) Filed: Oct. 30, 2018

(65) Prior Publication Data
US 2020/0134077 A1 Apr. 30, 2020

(51) Int. Cl.
G06F 16/25 (2019.01)
G06F 16/22 (2019.01)
G06F 16/2455 (2019.01)

(52) U.S. Cl.
CPC ........ *G06F 16/258* (2019.01); *G06F 16/2246* (2019.01); *G06F 16/2455* (2019.01)

(58) Field of Classification Search
CPC . G06F 16/258; G06F 16/2246; G06F 16/2455
See application file for complete search history.

(56) References Cited

U.S. PATENT DOCUMENTS

| | | | |
|---|---|---|---|
| 6,157,934 A | 12/2000 | Khan et al. | |
| 6,243,710 B1 | 6/2001 | DeMichiel et al. | |
| 7,043,534 B1 | 5/2006 | Donnelly et al. | |
| 7,444,584 B1 | 10/2008 | Hobbs | |
| 7,865,525 B1 | 1/2011 | Lusk et al. | |
| 7,870,492 B2 | 1/2011 | Mukundan et al. | |
| 9,201,924 B1 | 12/2015 | Fuller | |
| 9,384,203 B1* | 7/2016 | Seiver | G06F 16/285 |
| 9,524,323 B2 | 12/2016 | Meek et al. | |
| 10,162,613 B1 | 12/2018 | Vilozny et al. | |
| 10,657,317 B2 | 5/2020 | Khan et al. | |
| 2001/0027462 A1 | 10/2001 | Muramatsu | |
| 2004/0148592 A1 | 7/2004 | Vion-Dury | |
| 2004/0158812 A1 | 8/2004 | Dye et al. | |
| 2005/0107998 A1 | 5/2005 | McLernon et al. | |
| 2005/0165900 A1 | 7/2005 | Bodin et al. | |
| 2005/0192756 A1 | 9/2005 | Varpela et al. | |
| 2008/0022264 A1 | 1/2008 | Macklem et al. | |
| 2009/0077047 A1 | 3/2009 | Cooper et al. | |
| 2009/0100360 A1 | 4/2009 | Janzen et al. | |
| 2009/0217302 A1 | 8/2009 | Grechanik et al. | |
| 2009/0327468 A1 | 12/2009 | Hirsch et al. | |
| 2011/0029933 A1 | 2/2011 | Chu et al. | |
| 2011/0225195 A1 | 9/2011 | Kubicki et al. | |

(Continued)

OTHER PUBLICATIONS

Jolicode, "Using Rollup to merge old logs with Elasticsearch 6.3", archived on Jul. 11, 2018, https://web.archive.org/web/20180711144714/https://jolicode.com/blog/using-rollup-to-merge-old-logs-with-elasticsearch-6-3. (Year: 2018).*

*Primary Examiner* — Jay A Morrison
(74) *Attorney, Agent, or Firm* — Carr & Ferrell LLP

(57) ABSTRACT

Systems and methods for reducing data storage overhead are disclosed herein. In some embodiments, a system includes a rollup service that converts a raw data set into a rolled up index that takes up less storage than the raw data but is created in such a way that the rolled up index can be queried so as to generate responses that will substantially correspond to responses that would be generated using the raw data.

17 Claims, 5 Drawing Sheets

(56) References Cited

U.S. PATENT DOCUMENTS

| | | |
|---|---|---|
| 2012/0011458 A1 | 1/2012 | Xia et al. |
| 2012/0084301 A1 | 4/2012 | Samowicz et al. |
| 2012/0239420 A1 | 9/2012 | Stapelfeldt et al. |
| 2012/0253791 A1 | 10/2012 | Heck et al. |
| 2012/0304156 A1 | 11/2012 | Feiveson et al. |
| 2013/0346895 A1 | 12/2013 | Selgas et al. |
| 2014/0067755 A1* | 3/2014 | Ishimoto ............. G06F 16/2477 707/609 |
| 2014/0149399 A1 | 5/2014 | Kurzion |
| 2014/0280952 A1 | 9/2014 | Shear et al. |
| 2014/0297725 A1 | 10/2014 | Biron, III |
| 2014/0324778 A1* | 10/2014 | Bonnell ............. G06F 16/2237 707/634 |
| 2015/0058327 A1 | 2/2015 | Frank et al. |
| 2015/0058745 A1 | 2/2015 | Torgerson et al. |
| 2015/0222730 A1 | 8/2015 | Gower et al. |
| 2015/0324440 A1 | 11/2015 | Subramanian et al. |
| 2016/0232537 A1 | 8/2016 | Nonez et al. |
| 2016/0291942 A1 | 10/2016 | Hutchison |
| 2017/0124220 A1 | 5/2017 | Krueger et al. |
| 2017/0161390 A1 | 6/2017 | Kavas |
| 2017/0270572 A1 | 9/2017 | Schydlowsky |
| 2018/0032316 A1 | 2/2018 | Dinga et al. |
| 2018/0129746 A1 | 5/2018 | Zhu et al. |
| 2018/0181657 A1 | 6/2018 | Giardina et al. |
| 2018/0278725 A1 | 9/2018 | Thayer |
| 2018/0341956 A1 | 11/2018 | Everhart et al. |
| 2018/0375745 A1 | 12/2018 | Balupari |
| 2019/0265853 A1 | 8/2019 | Khan et al. |
| 2019/0266232 A1 | 8/2019 | Khan et al. |

\* cited by examiner

SYSTEMS AND METHODS FOR REDUCING DATA STORAGE OVERHEAD

CROSS-REFERENCE TO RELATED APPLICATION(S)

N/A

FIELD

The present disclosure is directed to systems and methods that reduce data storage overhead with respect to large volumes of raw historical data by generating rollup indices that summarize the raw historical data according to aggregation trees. These systems and methods also allow for query execution of the rollup indices and/or the raw data in an efficient manner for creation of graphical or visual data depictions.

SUMMARY

According to various embodiments, the present technology is directed to a method comprising: obtaining raw data from one or more systems providing one or more services, the raw data comprising data elements having corresponding fields and metrics, the data elements being obtained according to a first time interval, the raw data having a storage size; generating a rollup index of the raw data based on a first set of rollup parameters that comprise selections of the plurality of fields and metrics by: searching for matching ones of the data elements of the raw data that correspond to the first set of rollup parameters; grouping the data elements together based on the matching; flattening the data elements by rolling up the data elements into a document based on a second time interval that is larger than the first time interval; and storing the rollup index in a storage space, the rollup index being reduced in size relative to the raw data so as to reduce an amount of the storage space required to store rollup index relative to storing the raw data.

According to various embodiments, the present technology is directed to a system comprising: a rollup service configured to: obtain raw data from one or more systems providing one or more services, the raw data comprising data elements having corresponding fields and metrics, the data elements being obtained according to a first time interval, the raw data having a storage size; generate a rollup index of the raw data based on a first set of rollup parameters that comprise selections of the fields and metrics by: searching for matching ones of the data elements of the raw data that correspond to the first set of rollup parameters; grouping the data elements together based on the matching; flattening the data elements; and rolling up the data elements for placement into the rollup index based on a second time interval that is larger than the first time interval; and store the rollup index in a storage space, the rollup index being reduced in size relative to the raw data so as to reduce an amount of the storage space required to store rollup index relative to storing the raw data; and a search service endpoint configured to: receive a query having query parameters; parse the query parameters; search the query parameters against the rollup index; and generate a response using the rollup index.

According to various embodiments, the present technology is directed to a method comprising: obtaining raw historical data for a computing system, the raw historical data being according to a first time interval; converting the raw historical data into a rollup index, the rollup index comprising aggregations of data elements of the raw historical data which are grouped according to at least one field and at least one metric regarding the at least one field; and generating a query response for a query using the rollup index, the query response substantially corresponding to a query response when executed against the raw historical data due to the conversion of the raw historical data into the rollup index.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
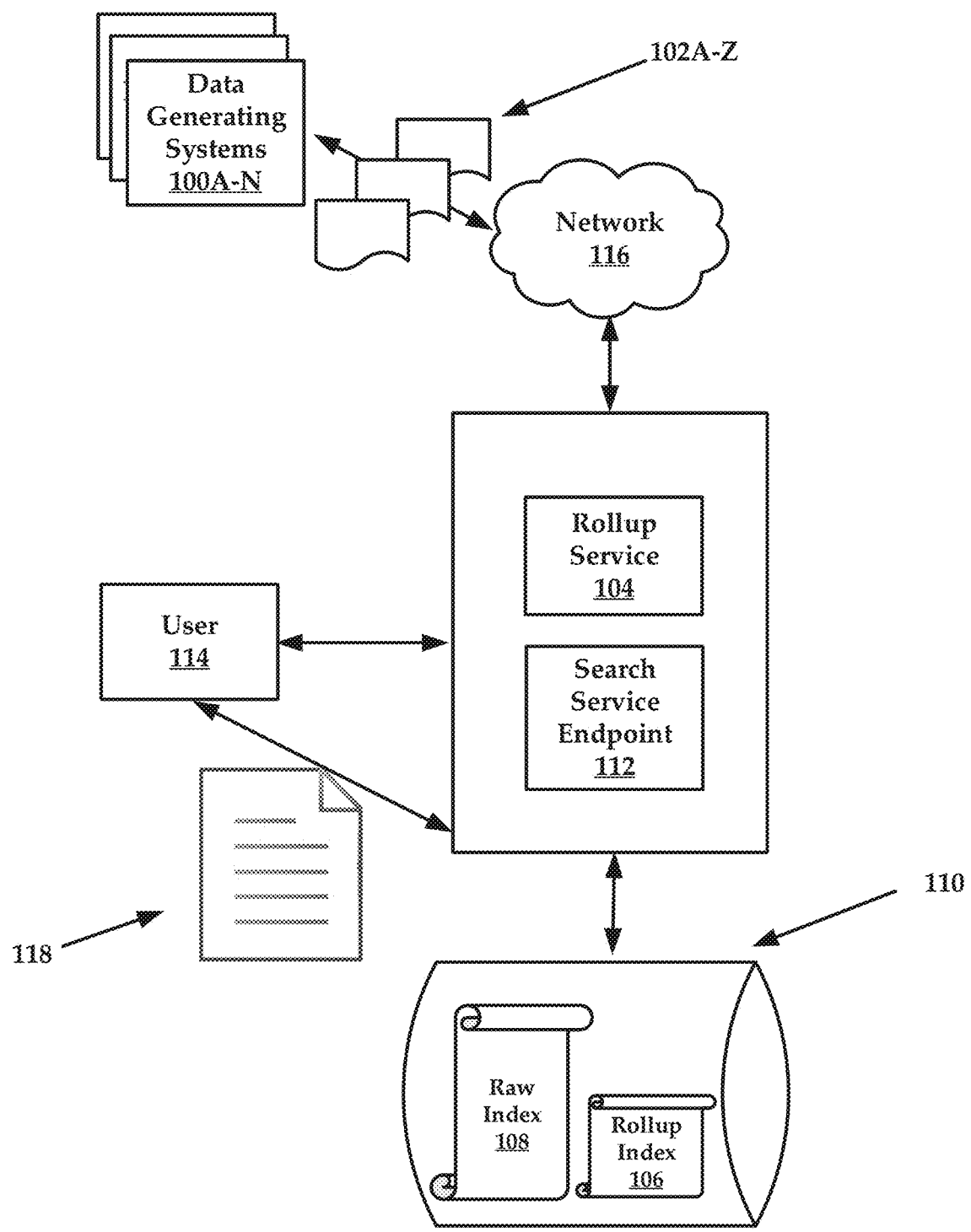
FIG. 1 is a schematic diagram of an example system constructed in accordance with the present disclosure.

The present disclosure relates generally to systems and methods that store raw historical data in a condensed but content rich format. These systems and methods can reduce large volumes of raw historical data into compact but useful rollup jobs and indices. A rollup index of the present disclosure can be queried against in a manner that is similar or identical to query methods for the raw historical data, for purposes of data analysis and visualization.

For context, in time-series storage and visualization systems, rollups are defined by reports and dashboards (e.g., graphical user interfaces) they are used to generate. This sort of pre-definition means that users are stuck with the same report even if the users need to change the report format and/or content. Such configurations are unduly limiting. Advantageously, the systems and methods disclosed herein do not sacrifice search speed even in view of a large data volume. To be sure there is substantial value in keeping the original, full, raw data allowing a user to analyze and parse it however they desire, without compromise, but this can lead to deleterious effects and cost.

High-level dashboards may need decades worth of data, but likely not decades worth of fine-grained data that takes up considerable disk space. The rollup functionalities disclosed herein allow users to pick all the fields they want rolled up and a new rollup index is created with aggregated portions of the raw data. This new rollup index then resides side-by-side (in some embodiments) with the raw data that it is be being rolled up from. Since rollups are functionally and conceptually similar to any other raw data index, only a lot smaller, users are already knowledgeable regarding how to query and aggregate the data inside. The systems and methods disclosed herein also implement a rollup API (application programming interface) that provides an ability to search both live (e.g., raw) and rollup data at the same time, returning data from both indices in a single response.

When raw data is retired to permanent storage any corresponding rollup index created therefrom can live on with other production indexes. Dashboard creation from rollup indices are not affected by these changes and retirement of old raw data. These processes are also very flexible. For example, if a user realizes a mistake in data collection has been made in a rollup, the user can direct a system of the present disclosure to pull an old raw data index back into production and run a new and improved rollup job.

Time-based data (documents that are predominantly identified by their timestamp) often have associated retention policies to manage data growth. For example, a system may be generating 500,000 documents every second. That will generate 43 million documents per day, and nearly 16 billion documents a year.

When these processes continue in perpetuity, storage requirements will continue to grow without bound. Retention policies are therefore often dictated by the simple calculation of storage costs over time, and what an organization is willing to pay to retain historical data. Often these policies require deleting data after a few months or years.

To be sure, storage cost is a fixed quantity. That is, it requires X money to store Y data, but the utility of a piece of data often changes with time. For example, sensor data gathered at millisecond granularity is extremely useful when generated, reasonably useful if a few weeks old, and only marginally useful if older than a few months. So while the cost of storing a millisecond of sensor data from ten years ago is fixed, the value of that individual sensor reading often diminishes with time. It is not useless as it could easily contribute to a useful analysis, but this reduced value often leads to deletion rather than paying the fixed storage cost.

Thus, the systems and methods disclosed herein rollup store historical data at reduced granularity to reduce storage overhead of data, while allowing users to analyze and assess the data that is most important to their needs. That is, data collected in time intervals of seconds can be aggregated into blocks of time such as hours or days, for example.

A rollup functionality as disclosed herein summarizes old, high-granularity raw data into a reduced granularity format for long-term storage. By "rolling" the data up into a single summary document, historical data can be compressed greatly compared to the raw data. For example, consider a system that is generating 43 million documents every day. The second-by-second data is useful for real-time analysis, but historical analysis looking over ten years of data are likely to be working at a larger interval such as hourly or daily trends. An example system of the present disclosure will compress the 43 million documents into hourly summaries saving vast amounts of storage space. The rollup feature automates this process of summarizing historical data. These and other aspects and advantages of the present disclosure are provided herein with reference to the collective drawings.

FIG. 1 is an example schematic diagram of an architecture for practicing aspects or embodiments of the present disclosure. In one embodiment, one or more systems 100A-N are generating a large volume of documents 102A-Z. A rollup server or cloud service 104 (generally rollup service) generates rollup indices, such as rollup index 106, from at least a portion of the raw data included in the large volume of documents 102A-Z. This rollup service 104 can be implemented as an API in some embodiments.

Also, a raw index 108 of the large volume of documents 102A-Z can be created and stored as well. Both the rollup index 106 and the raw index 108 can reside in a database 110. The rollup index 106 and/or raw index 108 can be queried using a search service endpoint 112 that can be co-located with the rollup server or cloud service 104. A user 114 can execute queries against the database 110 using the search service endpoint 112 and receive results in the form of reports or graphical interfaces such as histograms or data plots. In general, the components of the architecture can communicate through an example network 116 that can include any public and/or private network.

The documents 102A-Z can comprise any documents such as log files. For example, the documents can include network activities of devices with a specific IP addresses. Other example documents can include cloud compute resource availability and/or utilization, web service usage, query or searching services, real-time sensor data, as well as any other computer-implemented process or system that produces quantifiable or qualitative data. The raw data of these documents 102A-Z can be expressed in terms of fields and metrics. That is, the raw data is comprised of individual data elements. Each of the data elements comprises at least one field and at least one metric related to the at least one field. For example, field related to IP address can be used to identify every IP address that logs into a particular system or service. A metric relates to attributes of that field. For example, with respect to IP addresses, metrics could include a minimum or maximum amount of bandwidth used by each IP address tracked. Again, these are merely examples and specific details regarding fields and metrics are governed by the systems and/or services used to produce the raw data. As noted above, these raw data can be voluminous and consume a drastic amount of data storage.

These raw data can be collected at a specific interval, such as seconds or even milliseconds. This is referred to generally to as a first time interval. This first time interval represents the data collection/generation speed of the one or more systems 100A-N.

The rollup index 106 is generated from the raw data of these documents 102A-Z using the rollup service 104. In some embodiments, the means by which the rollup service 104 generates the rollup index 106 is in part dictated by the end user. That is, the end user can determine which fields and/or metrics are of interest and select these during the creation of a rollup job. In general, many rollup jobs can be initiated if needed. In some instances, a rollup job runs continuously in the background as the documents 102A-Z are being generated. In a continual process, the rollup service 104 will roll up the index or indices that are specified by the end user, placing the rolled documents in a secondary index (also of the user's choosing) such as the database 110.

In one non-limiting example, a series of data are provided in the documents 102A-Z which are indicative of sensor data (sensor-2017-01-01, sensor-2017-01-02, and so forth). Documents 102A-Z related to these sensors can be collected using the following code:

```
{ "timestamp": 1516729294000,
  "temperature": 200,
  "voltage": 5.2,
```

-continued

```
"node": "a" }
```

In general, the rollup service 104 will roll up these documents found into hourly summaries, which will allow the rollup service 104 to generate reports and dashboards such as report 118 with any time interval that is one hour or greater. To be sure, in this example, the hourly summary reflected by the roll up represents a second time interval that is longer than the first time interval that is measured in seconds or milliseconds. Thus, data representative of data elements gathered at second time intervals is summed up in the roll up index as an hourly summary. Again, these time intervals are examples and are not intended to be limiting.

An example roll up job is illustrated below:

```
{
    "index_pattern": "sensor-*",
    "rollup_index": "sensor_rollup",
    "cron": "*/30 ****?"
    "page_size" :1000,
    "groups" : {
    "date_histogram":
{
    "field": "timestamp",
    "interval": "60m" },
    "terms": {
        "fields": ["node"]} },
    "metrics": [
    {"field": "temperature", "metrics": ["min", "max", "sum"]},
    { "field": "voltage", "metrics": ["avg"]} }}
```

The rollup service 104 assigns the rollup job an identifier of "sensor" and executes the rollup job to rollup the index pattern "sensor-*". This job will find and rollup any index data that matches that pattern. Rollup summaries are then stored in a rollup index titled "sensor_rollup".

The cron parameter controls when and how often the job activates. When a cron schedule triggers, it will begin rolling up from where it left off after the last activation. So if the rollup job is configured such that the cron to run every 30 seconds, the job will process the last 30 seconds worth of data that was indexed into the sensor-* indices.

If instead the cron was configured to run once a day at midnight, the job would process the last 24 hours' worth of data. The choice is largely preference, based on how "real-time" the user wishes for the rollups to be, and if the user wishes to process continuously or move it to off-peak hours.

Next, the rollup service 104 is utilized to define a set of groups and metrics. In this example the metrics are selected to save the min/max/sum of a temperature field, and the average of the voltage field. In this example, the groups are created by defining the dimensions that will be used to pivot on at a later date when querying the data. The grouping in this rollup job allows for the later creation of a function such as date_histograms aggregations on the timestamp field, rolled up at hourly intervals. It also allows the rollup service 104 to run term(s) aggregations on a node field.

In this example, the cron is configured to run every 30 seconds, but the date_histogram is configured to rollup at 60 minute intervals. In this example the date_histogram function controls the granularity of the saved data. Data will be rolled up into hourly intervals, and the user will be unable to query with finer granularity. The cron controls when the process looks for new data to rollup. Every 30 seconds it will see if there is a new hour's worth of data and roll it up. If not, the rollup job goes back to sleep.

Often, it may not make sense to define such a small cron (30 s) on a large interval (1 h), because the majority of the activations will simply go back to sleep. But there is nothing incorrect about this selection. The rollup job is configured to intelligently function regardless of the time interval selected.

After the rollup job is created, it will be sitting in an inactive state. Thus, rollup jobs need to be started before they begin processing data (this allows the user to stop them later as a way to temporarily pause, without deleting the configuration).

As noted above, many different rollup jobs can be performed for a set of raw data. These rollup jobs can, in some instances, be partially or completely orthogonal in content to one another. For example, the above use case of sensor data could be combined with sales and marketing data regarding the sensors. Queries could be used to search through performance and sales data in single query, just as an example. The search service endpoint 112 (discussed in greater detail herein) can stitch together query responses using rollup jobs that are orthogonal in content to one another.

The query would include parameters directed to both sensor performance and sales data, possibly to determine if sensor performance is affecting sales for that particular sensor. The search service endpoint 112 can parse these separate query parts are search different rollup jobs in a single rollup index and concatenate the responses together in a single response.

In some embodiments the rollup service 104 exposes a unique search endpoint, such as the search service endpoint 112, which is used to search over rolled-up indexes and their corresponding rollup jobs. Importantly, this endpoint accepts normal Elasticsearch™ Query DSL. Thus, any application accessing the service does not need to learn a new DSL to inspect historical data; it can simply reuse existing queries and dashboards.

In certain embodiments, a rollup merges can merge live/raw and rolled data together. In more detail, a useful feature of the rollup service is the ability to query both "live", real-time data in addition to historical rolled up data in a single query. For example, a system may keep a month of raw data. After a month, it is rolled up into historical summaries using the rollup features described herein and the raw data is deleted. If the user were to query the raw data, they would only see the most recent month. And if the user were to query the rolled up data, you would only see data older than a month. The search service endpoint 112, however, supports querying both the raw index 108 and the rollup index 106 at the same time. It will take the results from both data sources and merge them together. If there is overlap between the "live" and "rolled" data, live data is preferred to increase accuracy.

Finally, rollup service 104 is capable of intelligently utilizing the best interval available. For example existing systems require a user to configure rollups to happen at daily intervals, any corresponding queries and charts will work with daily intervals. If the user prefers a monthly interval, the user will create another rollup that explicitly stores monthly averages, and so forth.

Advantageously, the rollup features disclosed herein store data in such a way that queries can identify a smallest available interval and use that for their processing. If rollups are stored at a daily interval, queries can be executed on daily or longer intervals (weekly, monthly, and so forth) without the need to explicitly configure a new rollup job. This helps alleviate one of the major disadvantages of a rollup system; reduced flexibility relative to raw data. Again, the query interval selected can be equal to or larger than the interval used to create the rollups that are queried. Thus, if the rollup is created with a minute interval the query executed against the rollup should be parameterized for minute, day, week, month, or larger intervals.

The following descriptions provide additional detail on searching rollup indexes (and additionally raw indexes). After one or more rollup jobs have run and processed some data, the search service endpoint 112 will execute a structured query. The rollup processes are configured so that users can use the same Query DSL syntax that they are accustomed to using with the raw data with the exception that it is run on the rolled up data instead.

An example query is provided for context:

```
GET /sensor_rollup/_rollup_search
{
    "size": 0,
    "aggregations": {
        "max_temperature": {
            "max": {
                "field": "temperature"
            }
        }
    }
}
```

This query resembles a simple aggregation that calculates the maximum of the temperature field. It will be understood that it is being sent to the sensor_rollup index instead of the raw sensor-* indices. It will be further understood that it is using the rollup_search endpoint. Results from the above query look like a normal aggregation response:

```
{
    "took" : 102,
    "timed_out" : false,
    "terminated_early" : false,
    "_shards" : ... ,
    "hits" : {
        "total" : 0,
        "max_score" : 0.0,
        "hits" : [ ]
    },
    "aggregations" : {
        "max_temperature" : {
            "value" : 202.0
        }
    }
}
```

The only notable difference is that the rollup search results have zero hits, but is identical syntactically to a search that would be performed on raw data. To be sure, even though the data was rolled up with hourly intervals and partitioned by node name, the query is calculating the max temperature across all documents. The groups that were configured in the job are not mandatory elements of a query; they are just extra dimensions that can be partition on. Second, the request and response syntax is nearly identical to standard DSL, making it easy to integrate into dashboards and applications.

Finally, these grouping fields cab be used to construct a more complicated query:

```
GET /sensor_rollup/_rollup_search
{
    "size": 0,
    "aggregations": {
```

-continued

```
        "timeline": {
            "date_histogram": {
                "field": "timestamp",
                "interval": "7d"
            },
            "aggs": {
                "nodes": {
                    "terms": {
                        "field": "node"
                    },
                    "aggs": {
                        "max_temperature": {
                            "max": {
                                "field": "temperature"
                            }
                        },
                        "avg_voltage": {
                            "avg": {
                                "field": "voltage"
                            }
                        }
                    }
                }
            }
        }
    }
}
```

Which returns a corresponding response:

```
{
    "took" : 93,
    "timed_out" : false,
    "terminated_early" : false,
    "_shards" : ... ,
    "hits" : {
        "total" : 0,
        "max_score" : 0.0,
        "hits" : [ ]
    },
    "aggregations" : {
        "timeline" : {
            "meta" : { },
            "buckets" : [
                {
                    "key_as_string" : "2018-01-18T00:00:00.000Z",
                    "key" : 1516233600000,
                    "doc_count" : 6,
                    "nodes" : {
                        "doc_count_error_upper_bound" : 0,
                        "sum_other_doc_count" : 0,
                        "buckets" : [
                            {
                                "key" : "a",
                                "doc_count" : 2,
                                "max_temperature" : {
                                    "value" : 202.0
                                },
                                "avg_voltage" : {
                                    "value" : 5.1499998569488525
                                }
                            },
                            {
                                "key" : "b",
                                "doc_count" : 2,
                                "max_temperature" : {
                                    "value" : 201.0
                                },
                                "avg_voltage" : {
                                    "value" : 5.700000047683716
                                }
                            },
                            {
                                "key" : "c",
                                "doc_count" : 2,
                                "max_temperature" : {
                                    "value" : 202.0
```

```
                },
                "avg_voltage" : {
                    "value" : 4.099999904632568
                }
            }
        ]
    }
  }
 ]
}
}
```

In addition to being more complicated (date histogram and a terms aggregation, plus an additional average metric), it is noteworthy that the date_histogram uses a 7 d (seven day) interval instead of 60 m (sixty minutes).

To preserve flexibility, a rollup job can be defined based on how future queries may need to use the data. Traditionally, systems force users to make decisions about what metrics to rollup and on what interval. For example, an average of cpu_time on an hourly basis. This is limiting; if, at a future date, the user wishes to see the average of cpu_time on an hourly basis and partitioned by host_name, not such query can be executed.

In some instances, the user could decide to rollup the [hour, host] tuple on an hourly basis, but as the number of grouping keys grows, so do the number of tuples the admin needs to configure. Furthermore, these [hours, host] tuples are only useful for hourly rollups. Daily, weekly, or monthly rollups would all require new configurations. The present disclosure also addresses these limitations. Rather than force the user to decide ahead of time which individual tuples should be rolled up, the rollup jobs disclosed herein are configured based on which groups are potentially useful to future queries. For example, this configuration:

```
"groups" : {
    "date_histogram": {
        "field": "timestamp",
        "interval": "1h",
        "delay": "7d"
    },
    "terms": {
        "fields": ["hostname", "datacenter"]
    },
    "histogram": {
        "fields": ["load", "net_in", "net_out"],
        "interval": 5
    }
}
```

Allows date_histogram's to be used on the "timestamp" field, terms aggregations to be used on the "hostname" and "datacenter" fields, and histograms to be used on any of "load", "net_in", "net_out" fields. Importantly, these aggs/fields can be used in any combination. This aggregation:

```
"aggs" : {
    "hourly": {
        "date_histogram": {
            "field": "timestamp",
            "interval": "1h"
        },
        "aggs": {
            "host_names": {
                "terms": {
                    "field": "hostname"
                }
            }
        }
    }
}
``` is just as valid as this aggregation:
```
"aggs" : {
    "hourly": {
        "date_histogram": {
            "field": "timestamp",
            "interval": "1h"
        },
        "aggs": {
            "data_center": {
                "terms": {
                    "field": "datacenter"
                }
            },
            "aggs": {
                "host_names": {
                    "terms": {
                        "field": "hostname"
                    }
                },
                "aggs": {
                    "load_values": {
                        "histogram": {
                            "field": "load",
                            "interval": 5
                        }
                    }
                }
            }
        }
    }
}
```

It is noteworthy that the second aggregation is not only substantially larger, it also swapped the position of the terms aggregation on "hostname", illustrating how the order of aggregations does not matter to rollups. Similarly, while the date_histogram is required for rolling up data, it is not required while querying (although often used). For example, this is a valid aggregation for a rollup search to execute:

```
"aggs" : {
    "host_names": {
        "terms": {
            "field": "hostname"
        }
    }
}
```

Ultimately, when configuring groups for a rollup job, the user can contemplate how they might wish to partition data in a query at a future date and then include those in the configuration details of the rollup job (e.g., fields and metrics selected). Because rollup search functionality allows any order or combination of the grouped fields, the user need only decide if a field is useful for aggregating, and how they might wish to use it (terms, histogram, and so forth) in the future.

During searching, the search service endpoint 112 will break a query down into parts through parsing. In some embodiments, each distinct part of a query will be used to search either the raw index 108 and/or the rollup index 106.

In some embodiments, when querying raw data and rollup data, internally two search requests can be executed in parallel or series. The first search is performed against the raw data with the query in its original format. The second search is performed against the rollup data and uses procedures disclosed herein to determine which rollup job(s) to search.

The search service endpoint 112 employs logic that allows for determination of which of a plurality of rollup indexes are appropriate based on the query parts. By way of example, if there are ten rollup jobs stored in a single index, which cover the raw data with varying degrees of completeness and different intervals, the search service endpoint 112 needs to determine which set of jobs to actually search. Incorrect decisions can lead to inaccurate aggregation results (e.g. over-counting doc counts, or bad metrics). Additional details regarding the selection of rollup indices are found infra with respect to FIG. 3.

The search service endpoint 112 accepts one or more rollup indices. These can be a mix of regular, non-rollup indices and rollup indices. However, in some instances only one rollup index is specified. The exact list of rules for the index parameter are can include but are not limited to: (1) at least one index/index-pattern is specified. This can be either a rollup or non-rollup index. Omitting the index parameter, or using_all, is not permitted; (2) multiple non-rollup indices may be specified; and (3) only one rollup index may be specified.

As noted above, the rollup service 104 can utilize different interval granularity than that used for collecting raw data. Rollups are stored at a certain granularity, as defined by the date_histogram group in the configuration. This means a user can only search/aggregate the rollup data with an interval that is greater-than or equal to the configured rollup interval. For example, if data is rolled up at hourly intervals, the rollup service 104 can aggregate on any time interval hourly or greater. Intervals that are less than an hour will generate an error, since the data simply does not exist for finer granularities.

As an aside, the interval used with respect to a query is referred to in some embodiments as a third time interval. Thus, the first time interval is with respect to how the raw data is gathered, the second time interval relates to the rollup job, and the third time interval relates to the query executed against the rollup job.

The interval specified in an aggregation request can be a whole multiple of the configured interval. If the job was configured to rollup on 3 d (three day) intervals, the user can only query and aggregate on multiples of three (3 d, 6 d, 9 d, etc). In some embodiments it is recommended to configure a single job with the smallest granularity that is needed, and allow the search endpoint to function as selected at a later point in time. In some embodiments, if multiple jobs are present in a single rollup index with varying intervals, the search service endpoint 112 will identify and use the job(s) with the largest interval to satisfy the search request.

In certain embodiments, the rollup service 104 is configured to allow queries for a term, terms, a range, and match all, and/or any compound query (Boolean, Boosting, ConstantScore™, and so forth). Furthermore, these queries can only use fields that were also saved in the rollup job as a group. If you wish to filter on a keyword hostname field, that field must have been configured in the rollup job under a terms grouping.

Figure 2:
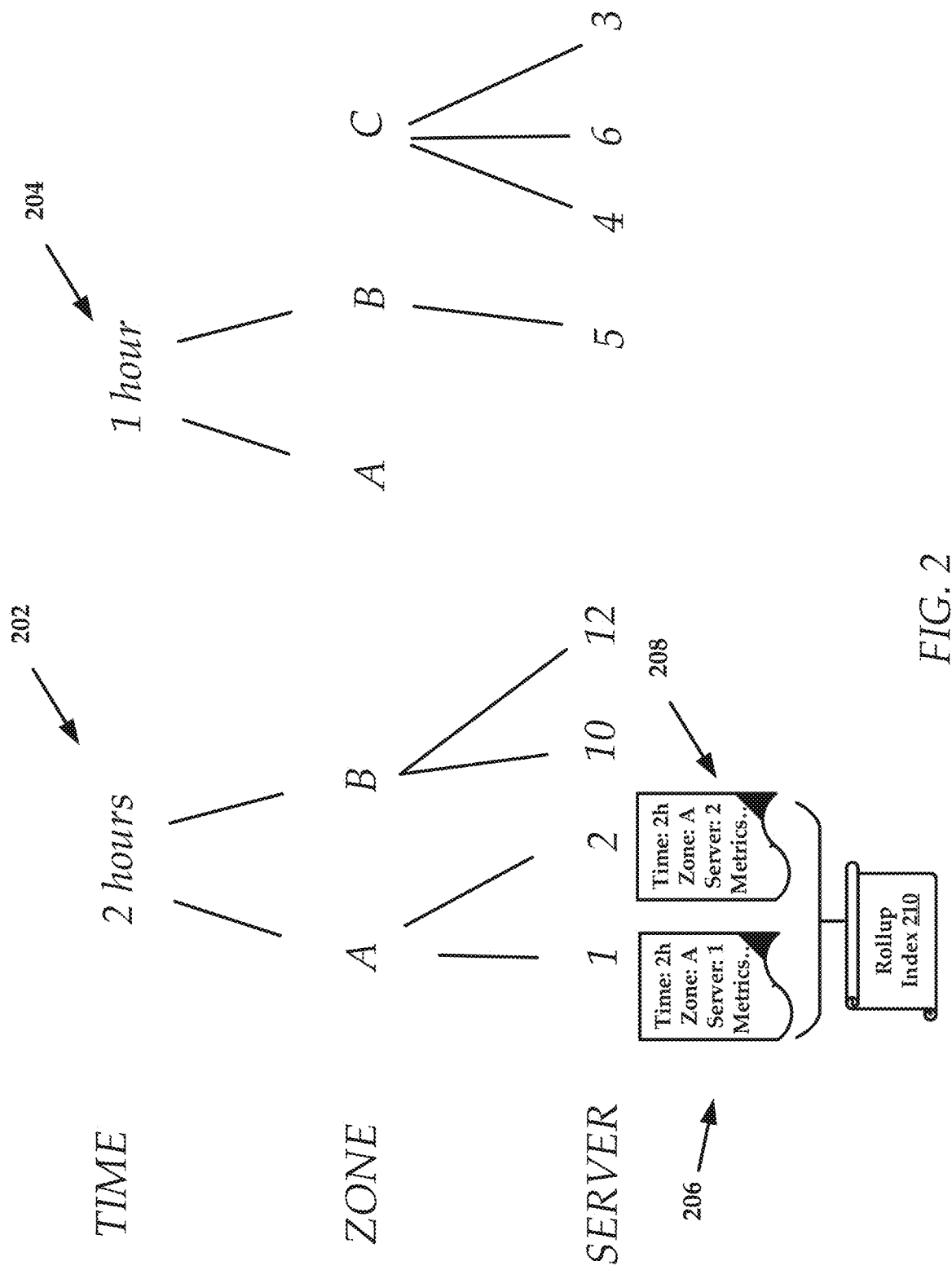
FIG. 2 is a diagrammatic representation of the use of aggregation trees to flatten data and coalesce rollup jobs into a rollup index.

FIG. 2 illustrates an example diagrammatic example of how raw data is converted into a rollup index using aggregation trees. In general, each tree represents one rollup interval worth of time. In this example, two aggregation trees 202 and 204 are illustrated, which illustrate a chronological progression. The aggregation tree 202 is scheduled for creation at a point in time that is two hours in the future, whereas the aggregation tree 204 is created one hour in the future. So when the rollup service 104 is running it would obtain these two aggregation trees 202 and 204 then work recursively iterate through the "leaf" nodes and create a rollup document for each.

Each "leaf" of the aggregation tree is a summary document of the raw data of the branch of the tree to which it belongs. In general, the raw data includes data elements that comprise at least one field and at least one metric related to the at least one field.

For example, the document 206 includes information regarding time, zone, and server which produced the raw data document 206. In this instance, the data leaves/documents of Zone A generated by Servers 1 and 2 are rolled up into a rollup index 210. In this example, another document 208 is generated for Server 2 of Sone A. Each of the documents 206/208 represents a unique rollup job.

Each of the example documents 206 and 208 comprises the data elements of a rollup job. The aspect of flattening of data elements involves the creation of the aggregation trees and the grouping of data elements that are alike. The "flattening" of the raw data occurs through the creation of the leaf documents at the bottom-most level of the aggregation tree 202. The documents 206/208 can be combined into a single rollup index 210 for storage and future querying.

Figure 3:
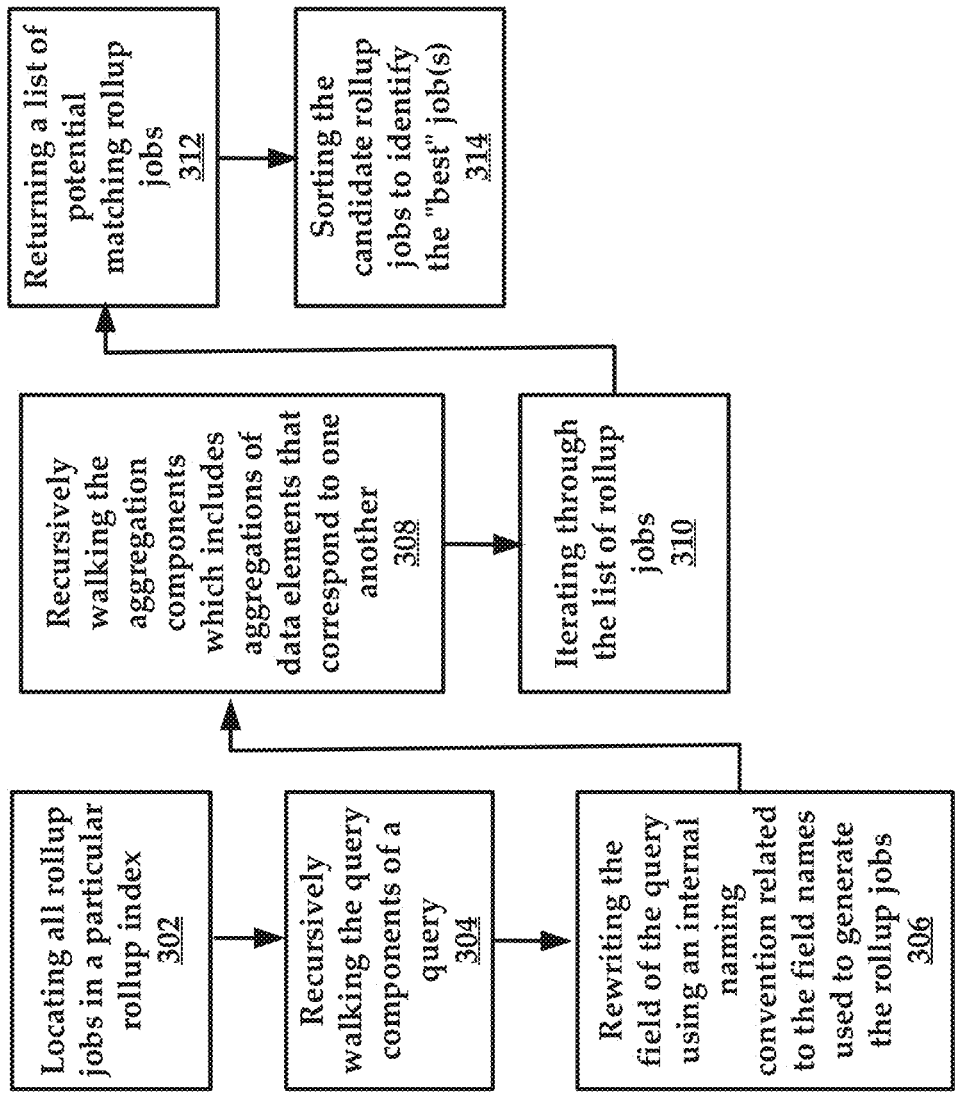
FIG. 3 is a flowchart of an example method for identifying rollup jobs of a rollup index using a recursive process.

FIG. 3 is a flow diagram of an example rollup index searching process. The method includes an initial step 302 of locating all rollup jobs in a particular rollup index. Again, a rollup index can comprise a plurality of rollup jobs that can be related or even orthogonal in content to one another.

Next, the method includes a step 304 of recursively walking the query components of a query. This includes steps related to obtaining a query and parsing the query into distinct parts or fields. Each of these parts is recursively walked with respect to the rollup jobs located in step 302. At each recursive step, the method determines if the query field exists in the rollup index. If not the process terminates and a warning can be presented to the user. Next, the method includes a step 306 of rewriting the field of the query using an internal naming convention related to the field names used to generate the rollup jobs. This may be an optional step in some embodiments.

Next, the method includes a step 308 of recursively walking the aggregation components which includes aggregations of data elements that correspond to one another. As noted above, this could include sensor data or IP addresses. In some embodiments, the method includes a step 310 of iterating through the list of rollup jobs located in step 302 and removing any of the rollup jobs that do not satisfy the aggregation component's requirements (e.g., same field type, same settings, and so forth). After iterating through all the jobs, if there are no candidate jobs left the process can terminate and a warning message can be presented to the user.

For context, some aggregations (like a terms aggregation, or a date_histogram) can contain "children" aggregations. This could be another terms agg, for example or it could be a "leaf" aggregation that contains no children (like a min, max, average, etc.) metric agg. Once the bottom of a tree is reached and an aggregation is found that contains no more children, it will be determined if there is a rollup job that supports the data encountered up to this point in the iterative process.

If so, the method includes a step 312 of returning a list of potential matching rollup jobs. If no leaf nodes are found, the list of candidate rollup jobs are passed to the child aggregation step above and the process is initiated over again. It can be assumed that all candidate rollup jobs that pass step 312 satisfy all the aggregation components requirements, so they are all usable. Next, the method includes a step 314 of sorting the candidate rollup jobs to identify the "best" job(s). The final, "best" candidate job is the one that will be searched and used to generate a query response.

With respect to sorting, in some embodiments, sorting criteria are utilized to sort rollup jobs. In one embodiment, rollup jobs can be sorted by date_histogram interval. It will be understood that larger intervals are "better" as they provide larger aggregation pools. If there are ties, the method will prefer a rollup job with a larger average histogram interval. Also, if there are ties, the method will prefer the rollup job with fewer terms groups.

Figure 4:
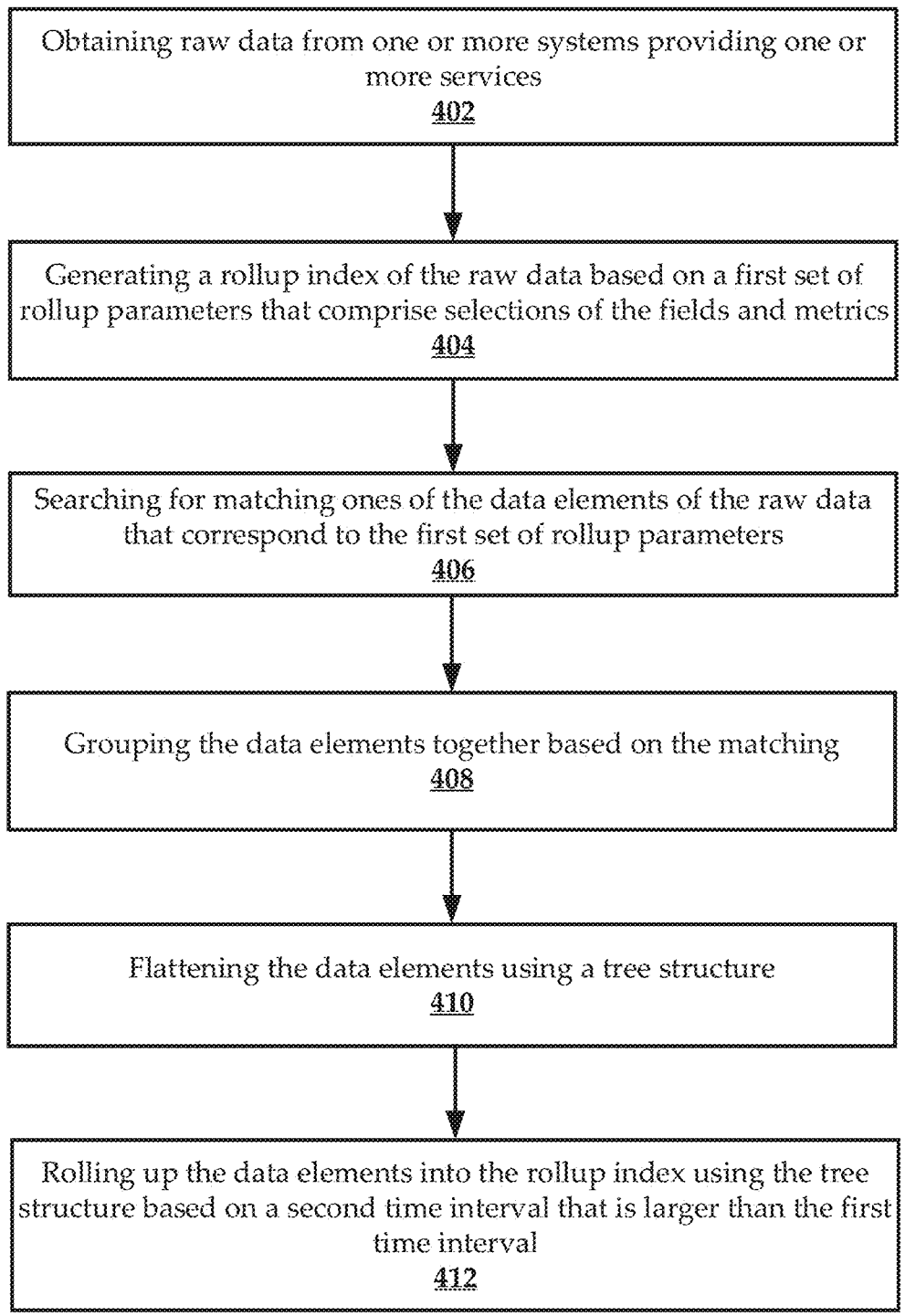
FIG. 4 is a flowchart of an example method of the present disclosure.

FIG. 4 is another flowchart of an example method of the present disclosure. The method includes a step 402 of obtaining raw data from one or more systems providing one or more services. As noted above the raw data comprises data elements having corresponding fields and metrics. In general, the data elements are obtained according to a first time interval such as every second or every ten seconds. This creates a volume of raw data having a storage size that in some instances is quite large in volume.

Next, the method includes a step 404 of generating a rollup index of the raw data based on a first set of rollup parameters that comprise selections of the fields and metrics. That is, the user can select which fields and metrics are important to them. These selections are then used to guide the creation of rollup jobs that can be coalesced into a rollup index. The method includes a step 406 of searching for matching ones of the data elements of the raw data that correspond to the first set of rollup parameters. Next, the method includes a step 408 of grouping the data elements together based on the matching, as well as a step 410 of flattening the data elements using a tree structure. In one or more embodiments, the method includes a step 412 of rolling up the data elements into the rollup index using the tree structure based on a second time interval that is larger than the first time interval. The rollup index can be stored alongside the raw data with both being available to search through a querying service.

Figure 5:
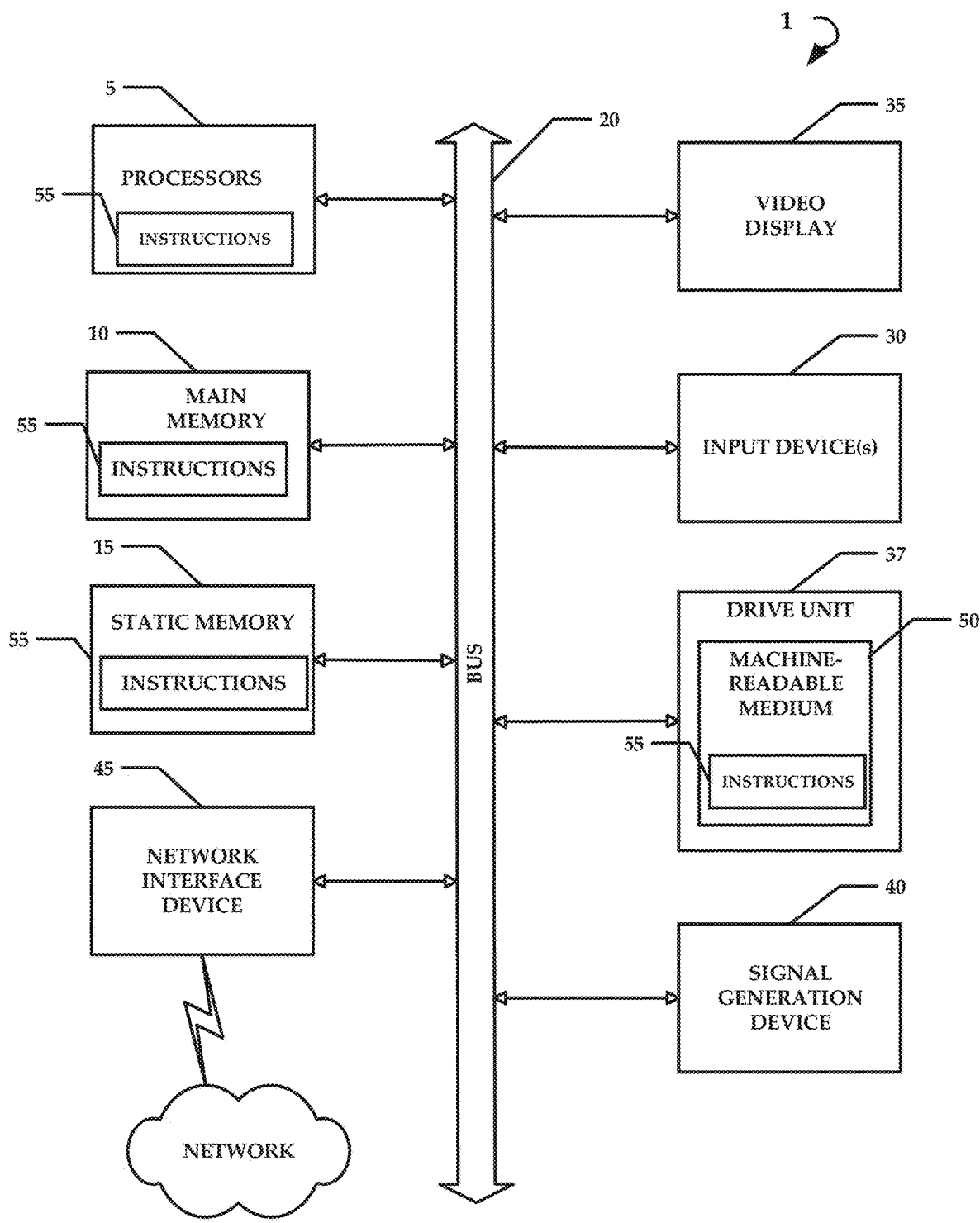
FIG. 5 is a schematic diagram of an example computer device that can be utilized to implement aspects of the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, section, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
    obtaining raw data from one or more systems providing one or more services, the raw data comprising data elements having corresponding fields and metrics, the data elements being obtained according to a first time interval, the raw data having a storage size;
    generating a rollup index of the raw data based on a first set of rollup parameters that comprises selections of the fields and metrics by:
        searching for matching ones of the data elements of the raw data that correspond to the first set of rollup parameters;
        grouping the data elements together based on the matching;
        flattening the data elements using a tree structure; and
        rolling up the data elements into the rollup index using the tree structure based on a second time interval that is larger than the first time interval;
    storing the rollup index in a storage space, the rollup index being reduced in size relative to the raw data so as to reduce an amount of the storage space required to store the rollup index relative to storing the raw data;
    storing the raw data along with the rollup index, wherein the raw data comprises at least a last segment of the raw data covering a latter portion of the first time interval, wherein the rollup index comprises additional flattened data elements selected using a second set of rollup parameters, wherein the second set of rollup parameters are orthogonal in content to the first set of rollup parameters;
    receiving a query having query parameters;
    parsing the query parameters;
    initially searching the last segment of the raw data for portions of the data elements that correspond to the query parameters prior to searching the rollup index;
    searching the query parameters against the rollup index; and
    generating a response using the rollup index.

2. The method according to claim 1, wherein when the first time interval is measured in milli-seconds the second time interval is measured in any of days, weeks, months, years, or other time frames that are larger than seconds.

3. The method according to claim 1, wherein the response is generated relative to a third time interval that is larger than the second time interval.

4. The method according to claim 1, wherein the rollup index is continually updated as the one or more systems generate new data elements.

5. The method according to claim 4, wherein when the first time interval is measured in seconds the second time interval is measured in any of days, weeks, months, years, or other time frames that are larger than seconds.

6. The method according to claim 4, wherein a rollup service is configured to store the raw data along with the rollup index.

7. A system, comprising:
    a processor configured to:
        initiate a rollup service, the rollup service being configured to:
            obtain raw data from one or more systems providing one or more services, the raw data comprising data elements having corresponding fields and metrics, the data elements being obtained according to a first time interval, the raw data having a storage size;
            generate a rollup index of the raw data based on a first set of rollup parameters that comprises selections of the fields and metrics by:
                searching for matching ones of the data elements of the raw data that correspond to the first set of rollup parameters;
                grouping the data elements together based on the matching;
                flattening the data elements; and
                rolling up the data elements for placement into the rollup index based on a second time interval that is larger than the first time interval;
            store the rollup index in a storage space, the rollup index being reduced in size relative to the raw data so as to reduce an amount of the storage space required to store rollup index relative to storing the raw data;
            store the raw data along with the rollup index, wherein the raw data comprises at least a last segment of the raw data covering a latter portion of the first time interval, wherein the rollup index comprises additional flattened data elements selected using a second set of rollup parameters, wherein the second set of rollup parameters are orthogonal in content to the first set of rollup parameters; and
        initiate a search service endpoint, the search service endpoint being configured to:
            receive a query having query parameters;
            parse the query parameters;
            initially search the last segment of the raw data for portions of the data elements that correspond to the query parameters prior to searching the rollup index;
            search the query parameters against the rollup index; and
            generate a response using the rollup index; and a memory in communication with the processor, the memory being configured to store instructions executable by the processor.

8. The system according to claim 7, wherein the response is generated relative to a third time interval that is larger than the second time interval.

9. The system according to claim 8, wherein the rollup index is continually updated as the one or more systems generate new data elements.

10. The system according to claim 9, wherein when the first time interval is measured in seconds the second time interval is measured in any of days, weeks, months, years, or other time frames that are larger than seconds.

11. The system according to claim 10, wherein the rollup service is configured to store the raw data along with the rollup index.

12. A method, comprising:
    obtaining raw historical data for a computing system, the raw historical data being obtained according to a first time interval;

converting the raw historical data into a rollup index, the rollup index comprising aggregations of data elements of the raw historical data which are grouped according to at least one field and at least one metric regarding the at least one field;

storing the raw historical data along with the rollup index, wherein the raw historical data comprises at least a last segment of the raw historical data covering a latter portion of the first time interval, wherein the rollup index comprises additional flattened data elements selected using a second set of rollup parameters, wherein the second set of rollup parameters are orthogonal in content to a first set of rollup parameters;

receiving a query having query parameters;

parsing the query parameters;

initially searching the last segment of the raw historical data for portions of the data elements that correspond to the query parameters prior to searching the rollup index;

searching the query parameters against the rollup index; and generating a query response for the query using the rollup index, the query response substantially corresponding to a query response when executed against the raw historical data due to the conversion of the raw historical data into the rollup index.

13. The method according to claim 12, wherein the raw historical data is converted into the rollup index using flattened aggregation trees.

14. The method according to claim 12, wherein the aggregations of data elements in the rollup index are obtained relative to a second time interval that is greater than the first time interval, wherein the query response is generated relative to a third time interval that is greater than or equal to the second time interval.

15. The method according to claim 14, wherein the rollup index is continually updated as one or more systems generate data elements.

16. The method according to claim 14, wherein when the first time interval is measured in seconds the second time interval is measured in any of days, weeks, months, years, or other time frames that are larger than seconds.

17. The method according to claim 14, wherein a rollup service is configured to store the raw historical data along with the rollup index.

* * * * *